W. H. BURKHART.
Harvester.
No. 47,926.
2 Sheets—Sheet 1.
Patented May 30, 1865.
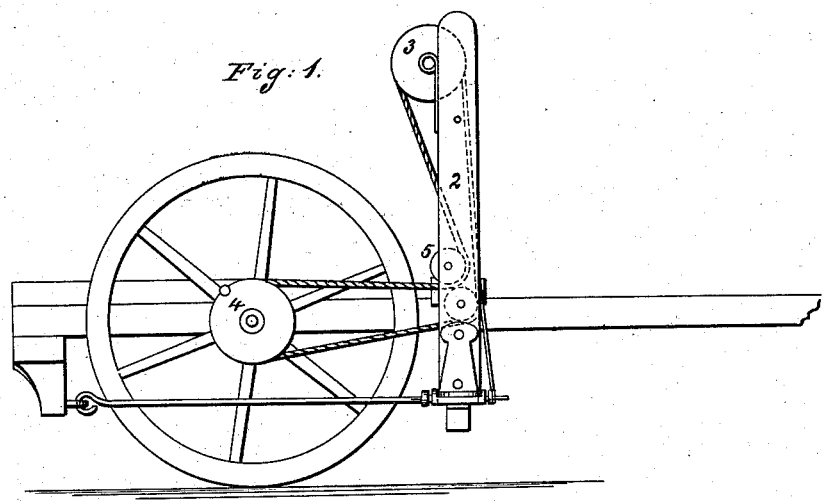
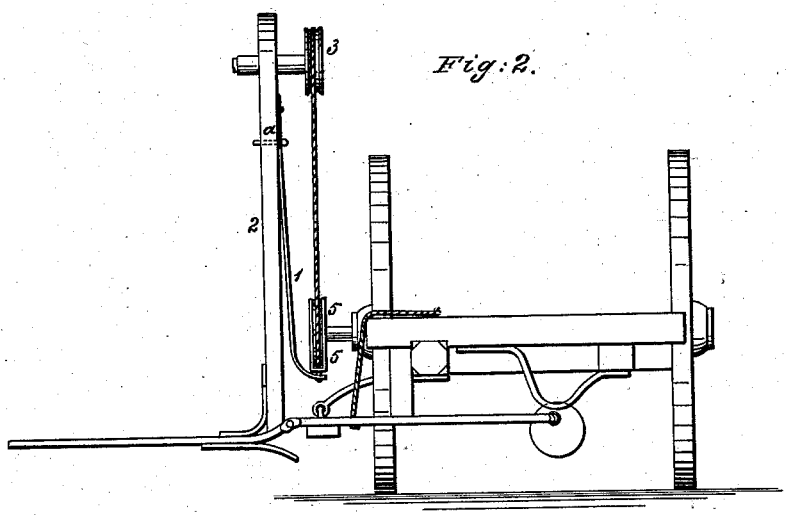

W. H. BURKHART.
Harvester.
No. 47,926.
2 Sheets—Sheet 2.
Patented May 30, 1865.
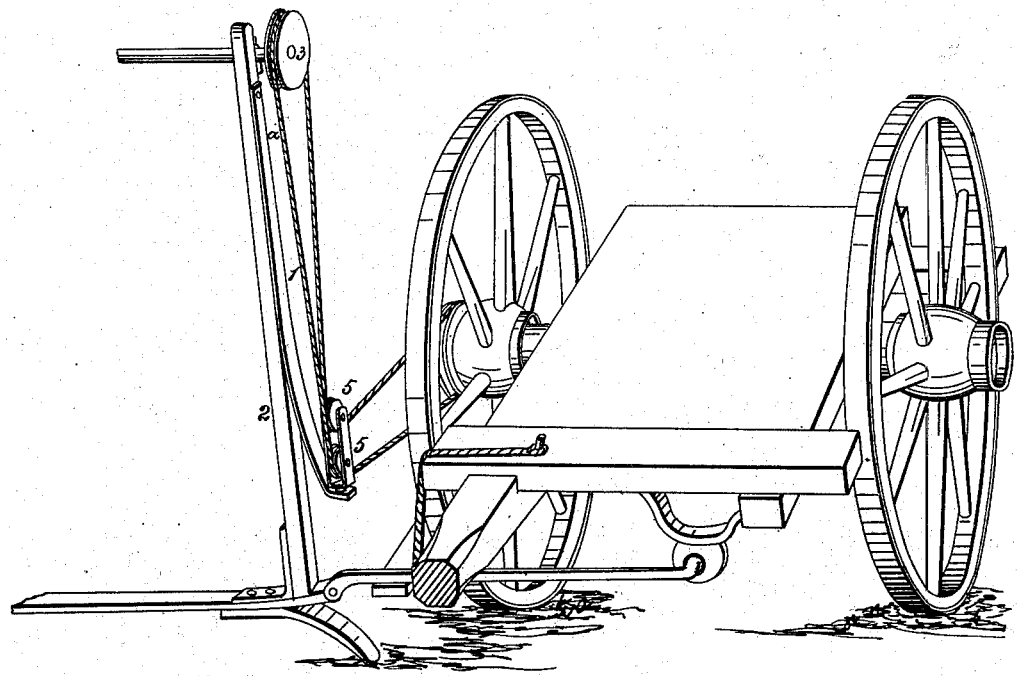

UNITED STATES PATENT OFFICE.

WM. H. BURKHART, OF BUCYRUS, OHIO.

IMPROVEMENT IN HARVESTERS.

Specification forming part of Letters Patent No. 47,926, dated May 30, 1865.

*To all whom it may concern:*

Be it known that I, WILLIAM H. BURKHART, of the town of Bucyrus, in the county of Crawford and State of Ohio, have invented a new and useful Improvement in Reaping and Mowing Machines; and I do hereby declare that the following is a full, clear, and exact description of the same, reference being had to the accompanying drawings, forming part of this specification, in which drawings a perspective view, an elevation of the side, and an elevation of the front of a harvester with my improvement applied to it are shown.

The same figures of reference used on the several figures indicate corresponding parts.

My improvement relates to that class of reaping and mowing machines in which the cutting apparatus is hinged so as to vibrate in a vertical circle, and upon which hinged cutting apparatus the reel-post is mounted, so as to partake of the motions of the cutting apparatus.

The nature of my invention consists in an improved arrangement of a long steel spring in connection with the chain or cord passing from the drive-wheel to the reel-wheel, and with a swiveling pulley-box, all as will be hereinafter described.

By my arrangement of the spring the belt, cord, or chain will be kept "taut," no matter how great may be the amount of rise or elevation of the cutting apparatus on its hinge-joint.

The long steel spring arranged in the position I have shown is far preferable to a rubber spring which is compressed between the pulley-box and a plate or nut, because with the rubber spring there is but little elasticity. Probably a rubber spring will not expand or contract an inch, perhaps not more than half an inch, while my spring will have a volume of expansion or contraction, or, more properly speaking, will admit of a movement or play of three or four inches.

My spring will admit of three or four inches being cut out of an ordinary chain, and still will operate with sufficient elasticity. Besides this, it provides against the reel stopping or becoming ungeared by any lateral motion of the reaper in passing over uneven ground. In a word, my spring will allow the chain to follow any motion the machine may make without becoming inoperative.

In the drawings, 1 designates a steel spring about two and a half feet long, about one and a half inch wide, and about one-fourth of an inch thick, fastened to the reel-post 2 at *a*. From this point of attachment, which is near the top of the reel-post or a short distance below the reel-shaft, the spring extends down to near the bottom of the same, and at its lower terminus it makes a short curve, so as to form a step, as shown. Upon this step a pulley-box with two pulleys, 5 5, within it is arranged so as to swivel, as will be evident from the drawings. The chain which turns the reel passes from the wheel attached to the main or driving pulley 4, then under the pulleys 5 5, and therefrom to the pulley attached to the reel-shaft 3.

From the foregoing description and the accompanying drawings it is seen that the spring is nearly vertical or upright, and occupies a position alongside the reel-post. Thus arranged, and the pulleys 5 5 being connected through their swiveling box to its lower end, the spring will yield to the motions of the machine, keep the chain on the wheel, and will not allow the chain to slacken so as to stop the revolutions of the reel, nor tighten it so as to break the chain by the rising and falling of the cutter-bar and reel-post.

What I claim as my invention, and desire to secure by Letters Patent, is—

1. Arranging the spring 1 so that it is pendent from near the reel-shaft upon the reel-post, and so that it supports the pulleys 5 5 near the lower end of the reel-post, in the manner and for the purpose described.

2. The arrangement of the pendent spring 1, swiveling pulleys 5 5, reel-shaft 3, pulley 4, and driving chain or cord of the reel, in the manner and for the purpose described.

WILLIAM H. BURKHART.

Witnesses:
  THOMAS COUGHLIN,
  E. FERRALL.